(12) United States Patent
Fujisawa et al.

(10) Patent No.: US 11,646,862 B2
(45) Date of Patent: May 9, 2023

(54) RECEPTION DEVICE AND TRANSMISSION AND RECEPTION SYSTEM

(71) Applicant: THINE ELECTRONICS, INC., Tokyo (JP)

(72) Inventors: Ryota Fujisawa, Tokyo (JP); Tomohisa Higuchi, Tokyo (JP); Tomohiro Ishida, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 17/287,635

(22) PCT Filed: Oct. 16, 2019

(86) PCT No.: PCT/JP2019/040748
§ 371 (c)(1),
(2) Date: Apr. 22, 2021

(87) PCT Pub. No.: WO2020/085171
PCT Pub. Date: Apr. 30, 2020

(65) Prior Publication Data
US 2021/0391974 A1    Dec. 16, 2021

(30) Foreign Application Priority Data
Oct. 24, 2018  (JP) .............................. JP2018-200168

(51) Int. Cl.
*H04L 7/00* (2006.01)
*H04L 7/10* (2006.01)

(52) U.S. Cl.
CPC .............. *H04L 7/0016* (2013.01); *H04L 7/10* (2013.01)

(58) Field of Classification Search
CPC ..... H04L 7/0016; H04L 7/0079; H04L 7/033; H04L 7/10; H03L 7/087; H03L 7/095; H03L 7/08; H03L 7/085
See application file for complete search history.

(56) References Cited

U.S. PATENT DOCUMENTS

| | | | |
|---|---|---|---|
| 7,643,598 B2 * | 1/2010 | Byun | G01R 23/005 327/12 |
| 8,165,258 B2 * | 4/2012 | Weng | H04L 7/033 455/260 |

(Continued)

FOREIGN PATENT DOCUMENTS

| | | |
|---|---|---|
| JP | 2006-074524 A | 3/2016 |
| JP | 2017079353 A | 4/2017 |

(Continued)

OTHER PUBLICATIONS

International Preliminary Report on Patentability with the translation of Written Opinion dated May 6, 2021 from the International Bureau in International Application No. PCT/JP2019/040748.

(Continued)

*Primary Examiner* — Betsy Deppe
(74) *Attorney, Agent, or Firm* — Sughrue Mion, PLLC

(57) ABSTRACT

A transmitter 10B always transmits a signal (data in which a dock is embedded) generated by the serializer 11 to the communication link. The receiver 20B includes a recovery circuit 22, a deserializer 23, a selector 25, and a training signal generator 32. The training signal generator 32 generates and outputs a training signal for frequency synchronization of the recovering operation of the recovery circuit 22. The selector 25 receives the signal from the transmitter 10B via the communication link and receives the training signal output from the training signal generator 32. The selector 25 selects and outputs either the received signal or (Continued)

the training signal according to the level of the lock signal output from the recovery circuit 22.

9 Claims, 7 Drawing Sheets

(56) References Cited

U.S. PATENT DOCUMENTS

| | | | | |
|---|---|---|---|---|
| 8,995,595 | B2* | 3/2015 | Nishi | H04L 7/0075 |
| | | | | 375/354 |
| 9,083,476 | B2* | 7/2015 | Katsurai | H03L 7/18 |
| 10,644,868 | B2* | 5/2020 | Manian | H04L 7/0004 |
| 2017/0005784 | A1* | 1/2017 | Miura | H04L 7/0008 |

FOREIGN PATENT DOCUMENTS

| | | |
|---|---|---|
| WO | 2010/053021 A1 | 5/2010 |
| WO | 2012/105334 A1 | 8/2012 |
| WO | 2016/140076 A1 | 9/2016 |

OTHER PUBLICATIONS

Ming-Ta Hsieh et al., "Architectures for Multi-Gigabit Wire-Linked Clock and Data Recovery", IEEE Circuits and Systems Magazine, 4th Quarter 2008, vol. 8, issue 4, pp. 45-57 (13 pages total).
International Search Report dated Nov. 19. 2019 in Application No. PCT/JP2019/040748.

* cited by examiner

RECEPTION DEVICE AND TRANSMISSION AND RECEPTION SYSTEM

CROSS REFERENCE TO RELATED APPLICATIONS

This application is a National Stage of International Application No. PCT/JP2019/040748 filed on Oct. 16, 2019, claiming priority based on Japanese Patent Application No. 2018-200168 filed on Oct. 24, 2018.

TECHNICAL FIELD

The present invention relates to a receiver and a transmitting and receiving system.

BACKGROUND ART

In digital data communication, use of serial transmissions is preferred over parallel transmissions in order to reduce the number of communication links. The RS-232C standard is an example of a known serial transmission method. In this scheme, both the transmitter and the receiver respectively have clock sources. The transmitter generates a clock based on a reference clock output from a clock source included in the transmitter, and generates then transmits a signal to be transmitted to the receiver in synchronization with the clock. The receiver generates a clock based on a reference clock output from a clock source included in the receiver, and samples a received signal in synchronization with the clock.

Any difference between the oscillation frequencies of the respective clock sources of the transmitter and the receiver causes deviations between the transmission timing of the transmitting signal in the transmitter and the sampling timing of the received signal in the receiver. Over time, the deviations accumulate, and a bit error may occur when the receiver samples the received signal. The higher the data rate of a signal to be transmitted and received and the shorter the interval of 1 bit, the more easily this problem occurs. Therefore, it is difficult to use this method for a high-speed transmission.

A clock data recovery (CDR) technique is known (see Non-Patent Document 1) as a technique that is capable of solving such a problem. In the CDR technique, a transmitter transmits a signal as data in which a clock is embedded, and a receiver that receives the signal recovers the clock and the data. The receiver recovers data by sampling the received signal using the clock recovered from the received signal. Therefore, no problem occurs due to the difference between the clock frequencies.

In order to correctly recover the clock and data in the receiver, the clock extracted from the received signal should be in synchronization in frequency and phase with the edges of the data of the received signal. Therefore, in the technique described in Non-Patent Document 1, a communication link for transmitting a training signal (for example, a signal having a duty ratio of 0.5 and a constant period) for frequency synchronization of a recovering operation from a transmitter to a receiver, and a communication link for transmitting a signal of data in which a clock is embedded from the transmitter to the receiver are separately provided.

A common communication link may also be used to send a training signal and a clock-embedded data signal from a transmitter to a receiver. In which case, the transmitter transmits a training signal for frequency synchronization of the recovering operation, and the receiver performs frequency synchronization of the recovering operation using the training signal. When the frequency of the recovering operation of the receiver using the training signal is synchronized, a lock signal indicating the synchronization is transmitted from the receiver to the transmitter, and the transmitter receiving the lock signal transmits the original signal (data in which the clock is embedded) instead of the training signal. Upon receiving the original signal, the receiver phase-synchronizes the recovering operation to recover the clock and data from the received signal. If the frequency synchronization is lost due to a factor such as noise after the phase synchronization, the lock signal transmitted from the receiver to the transmitter indicates that the frequency synchronization is lost, and the transmitter receiving the lock signal transmits the training signal again.

CITATION LIST

Non-Patent Literature

[Non-Patent Document 1] Ming-ta Hsieh, et al, "Architectures for multi-gigabit wire-linked clock and data recovery, "IEEE Circuits and Systems Magazine, Vol. 8, Issue 4, Fourth Quarter, pp. 45-57 (2008).

SUMMARY OF INVENTION

Technical Problem

In conventional transmitting and receiving systems that use CDR technology, a communication link (hereinafter referred to as the "lock signal communication link") for sending a lock signal from the receiver to the transmitter indicating whether a recovering operation of the receiver is frequency-synchronized is required in addition to a communication link for sending a signal of data in which a clock is embedded, and a training signal from a transmitter to a receiver.

In order to save space and reduce costs, it is desirable to reduce the number of communication links. Furthermore, in the case of a communication link via optical fiber, if the communication link for the lock signal can be omitted, a converter between the electric signal and the optical signal for transmitting and receiving the lock signal can also be omitted, which enables cost reduction also in this respect. Further, in the case of a wireless communication link, if the communication link for the lock signal can be omitted, a converter between the electric signal and the wireless signal for transmitting and receiving the lock signal can also be omitted. Further, a band necessary for wireless communication can be reduced, again enabling cost reduction further in this respect.

The present invention has been made to solve the above-described problems, and an object of the present invention is to provide a receiver and a transmitting and receiving system capable of reducing the number of communication links when transmitting and receiving signals using the CDR technique.

Solution to Problem

A receiver of the present invention is a receiver for receiving a signal transmitted as clock-embedded data from a transmitter, comprising: (1) a recovery circuit for recovering and outputting data and clocks based on the input signal and outputting a lock signal indicating whether the recovering operation is frequency-synchronized; (2) a training signal generator for generating and outputting a training signal for frequency-synchronizing the recovering operation of the recovery circuit; (3) a selector that receives a signal from the transmitter, the training signal, and the lock signal, the selector inputting the signal from the transmitter into the recovery circuit when the lock signal indicates that the recovering operation is frequency-synchronized, and the selector inputting the training signal into the recovery circuit when the lock signal indicates that the recovering operation is not frequency-synchronized.

According to the receiver of the present invention, it is preferable that a power consumption in the training signal generator may be reduced when the lock signal indicates that the recovering operation is frequency-synchronized compared to when the lock signal indicates that the recovering operation is not frequency-synchronized.

According to the receiver of the present invention, it is preferable that the receiver may further comprise: a first dummy signal generator that generates a first dummy signal: and a first dummy selector that selects the training signal from the training signal and the first dummy signal to output the selected training signal to the selector.

A transmitting and receiving system of the present invention comprises: a transmitter that transmits a signal as data in which a clock is embedded; and the above receiver of the present invention that receives the signal transmitted from the transmitter.

In the transmitting and receiving system of the present invention, the transmitter preferably includes: a transmitting signal generator that generates and outputs a transmitting signal to be transmitted to the receiver: a second dummy signal generator that generates and outputs a second dummy signal; and a second dummy selector that selects the transmitting signal from the transmitting signal and the second dummy signal to transmit the selected transmitting signal to the receiver.

In the transmitting and receiving system of the present invention, it is preferable that a circuit block of the receiver including: the first dummy signal generator, the training signal generator, and the first dummy selector may have the same circuit configuration as a circuit block of the transmitter including: the transmitting signal generator, the second dummy signal generator, and the second dummy selector.

Effects of Invention

According to the present invention, it is possible to reduce the number of communication links when transmitting and receiving signals using the CDR technique. Furthermore, space saving and cost reduction can be achieved.

DESCRIPTION OF EMBODIMENTS

Hereinafter, embodiments of the present invention will be described in detail with reference to the appended drawings. In each drawing, the same reference signs are used for the same elements if possible. The present invention is not limited to these examples, but is defined by the scope of claims, and is intended to include all modifications within the scope and meaning equivalent to the scope of claims.

First, the configuration of a transmitting and receiving system 1A of the comparative example will be described, and then the configurations of transmitting and receiving systems 1B to 1E of the embodiment will be described in comparison with the comparative example.

Figure 1:
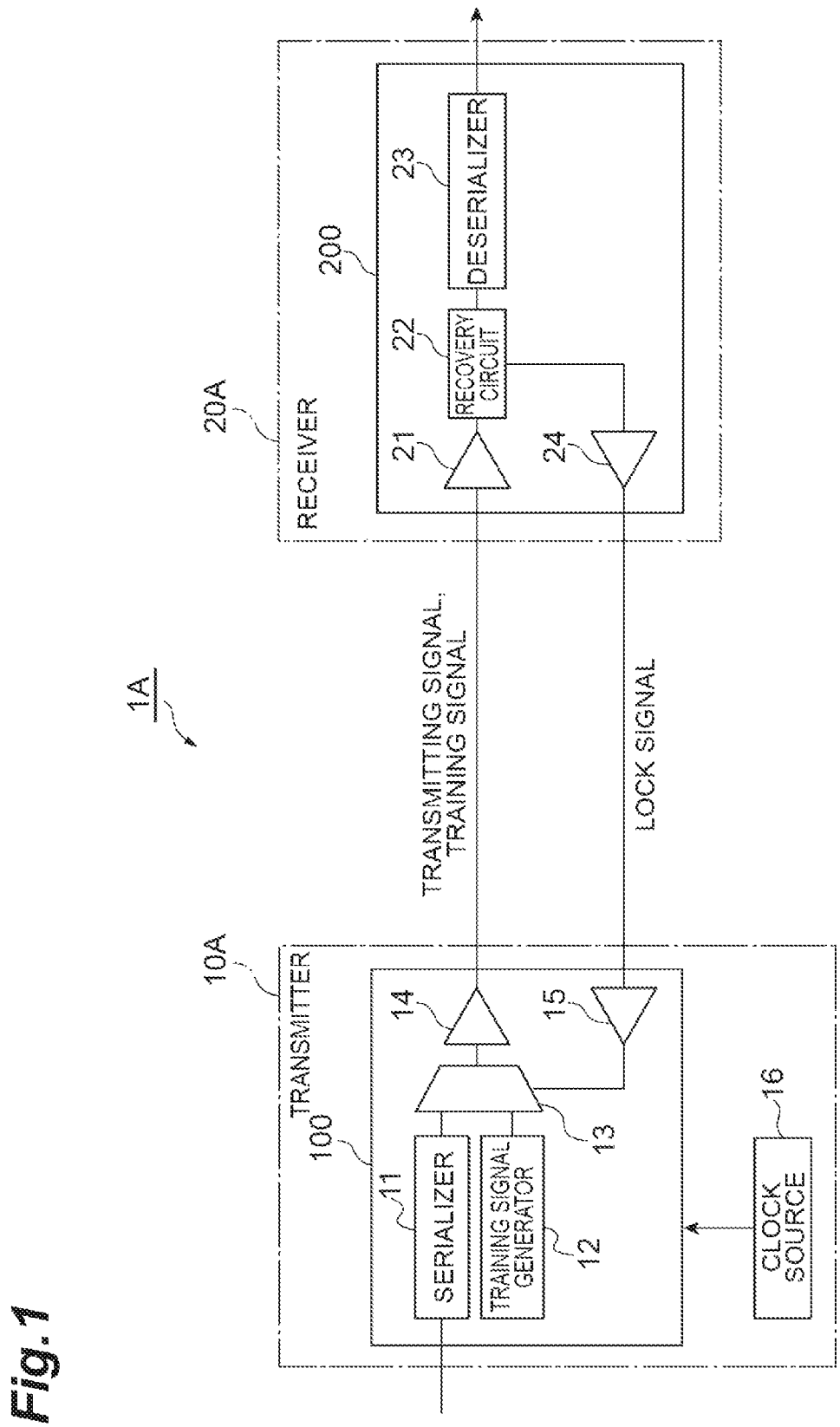
FIG. 1 is a diagram showing the configuration of a transmitting and receiving system 1A.

FIG. 1 is a diagram showing a configuration of the transmitting and receiving system 1A. The transmitting and receiving system 1A of the comparative example comprises a transmitter 10A and a receiver 20A.

The transmitter 10A includes a serializer 11, a training signal generator 12, a selector 13, an output buffer 14, an input buffer 15 and a dock source 16. The serializer 11 receives parallel data and converts it into serial data. The serializer 11 is a transmitting signal generator that generates and outputs a transmitting signal (serial data in which a dock is embedded) to be transmitted to the receiver 20A. The training signal generator 12 generates and outputs a training signal (for example, a signal having a duty ratio of 0.5 and a constant period) for frequency synchronization of the recovering operation of the recovery circuit 22 of the receiver 20A.

The selector 13 receives the transmitting signal output from the serializer 11 and the training signal output from the training signal generator 12. The selector 13 receives the lock signal from the input buffer 15, and selects and outputs either the transmitting signal or the training signal based on the level of the lock signal. The output buffer 14 transmits the signal output from the selector 13 to the communication link. The input buffer 15 receives the lock signal sent from the receiver 20A and supplies the lock signal to the selector 13. The clock source 16 outputs a reference clock that defines the timing of the overall operation in the transmitter 10A. In particular, the transmitting signal output from the serializer 11 and the training signal output from the training signal generator 12 are generated in synchronization with the clock generated based on the reference clock output from the clock source 16.

The receiver 20A includes an input buffer 21, a recovery circuit 22, a deserializer 23 and an output buffer 24. The input buffer 21 receives a signal arriving from the output buffer 14 of the transmitter 10A via the communication link, and inputs the received signal into the recovery circuit 22. The recovery circuit 22 recovers and outputs data and clock based on the input signal, and outputs a lock signal indicating whether the recovering operation is in the state of frequency synchronization. The deserializer 23 receives recover data (serial data) output from the recovery circuit 22 and converts it into parallel data. The output buffer 24 transmits the lock signal output from the recovery circuit 22 to the transmitter 10A.

In the transmitting and receiving system 1A configured as described above, when the recovering operation of the recovery circuit 22 of the receiver 20A is not frequency-synchronized, a lock signal indicating the fact is provided from the recovery circuit 22 to the selector 13 via the output buffer 24 and the input buffer 15. Then, the training signal is selected and output in the selector 13 of the transmitter 10A, and the training signal is given to the recovery circuit 22 via the output buffer 14 and the input buffer 21. The recovery circuit 22 frequency-synchronizes the recovering operation using the training signal.

When the recovering operation of the recovery circuit 22 is frequency-synchronized, a lock signal indicating the frequency synchronization is provided from the recovery circuit 22 to the selector 13 via the output buffer 24 and the input buffer 15. Then, a transmitting signal (data in which a clock is embedded) is selected and output by the selector 13 of the transmitter 10A, and the transmitting signal is given to the recovery circuit 22 via the output buffer 14 and the input buffer 21. The recovery circuit 22 receiving this signal synchronizes the phase of the recovering operation and recovers the dock and data from the received signal.

In the transmitting and receiving system 1A of this comparative example, in addition to a communication link for sending a transmitting signal (data in which a clock is embedded) and a training signal from the transmitter 10A to the receiver 20A, a communication link for a lock signal for sending a lock signal indicating whether the recovering operation of the recovery circuit 22 is frequency-synchronized from the receiver 20A to the transmitter 10A is also required.

Figure 2:
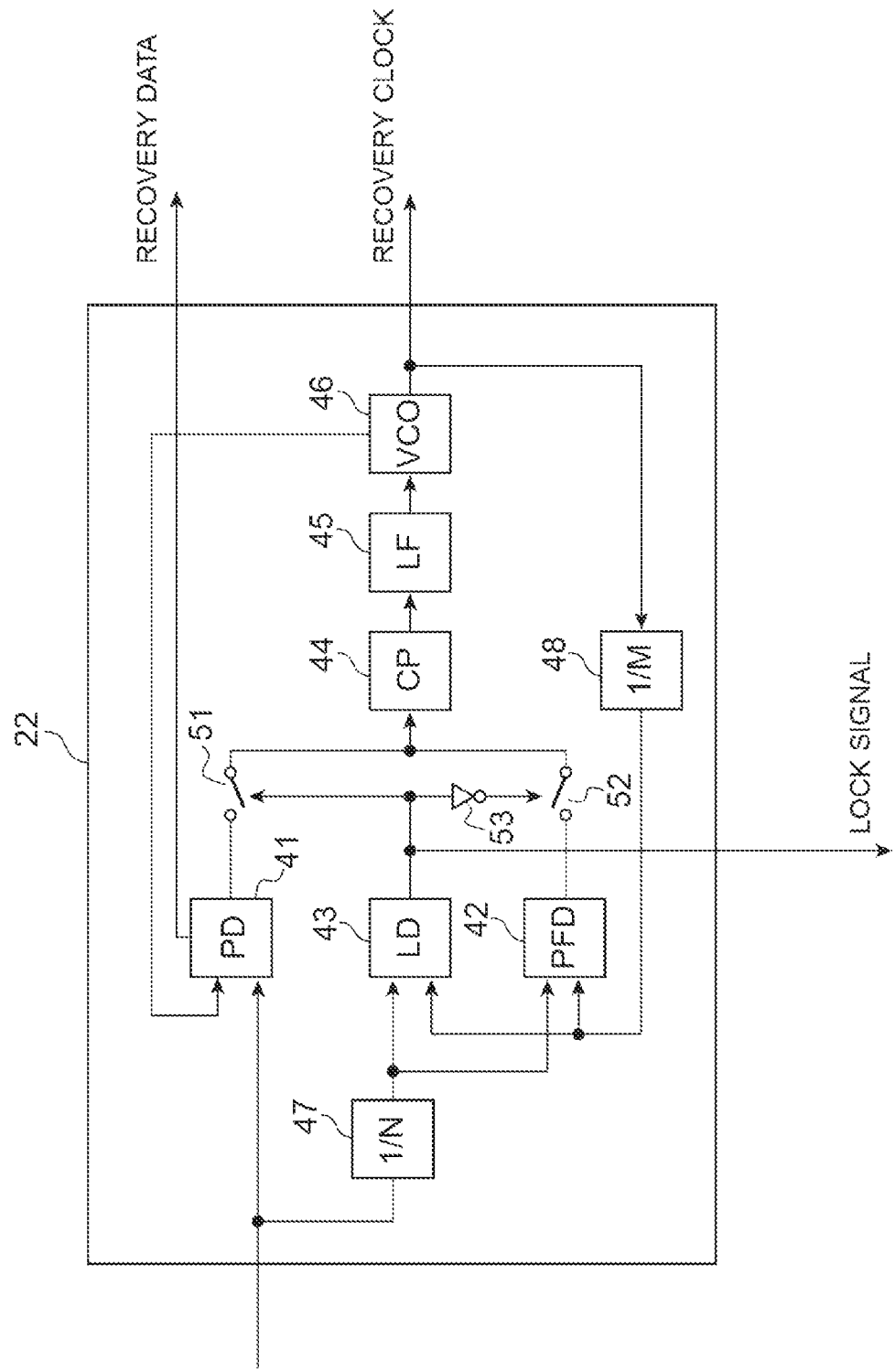
FIG. 2 is a diagram showing the configuration of a recovery circuit 22 shown in FIG. 2.

FIG. 2 is a diagram showing a configuration of the recovery circuit 22. The recovery circuit 22 includes a first phase comparator 41, a second phase comparator 42, a lock detector 43, a charge pump 44, a loop filter 45, a voltage-controlled oscillator 46, a frequency divider 47, a frequency divider 48, a switch 51, a switch 52 and an inverter circuit 53.

The first phase comparator 41 receives the signal output from the input buffer 21, receives the oscillation signal output from the voltage-controlled oscillator 46, and outputs a first phase-difference signal representing the phase difference between these 2 input signals. The first phase comparator 41 is a Bang-Bang type phase comparator (BBPD: Bang-Bang Phase Detector).

The second phase comparator 42 receives the signal output from the input buffer 21, receives the signal obtained by dividing the frequency of the oscillation signal output from the voltage-controlled oscillator 46 by the frequency divider 48, and outputs a second phase-difference signal representing the phase difference between the two input signals. The second phase comparator 42 is a phase frequency comparator (PFD: Phase Frequency Detector).

The lock detector 43 outputs a lock signal indicating whether the frequency synchronization is established between the two signals input to the second phase comparator 42. The switch 51 and the switch 52 are set to the ON/OFF state based on the output signal of the lock detector 43. The inverter circuit 53 is provided between the output terminal of the lock detector 43 and the switch 52, and when one of the switch 51 and the switch 52 is in an ON state, the other is in an OFF state by the inverter circuit 53.

While the lock detector 43 determines that the frequency synchronization is not being established, switch 51 is in the OFF state and switch 52 is in the ON state. Conversely, during a period in which the lock detector 43 determines that frequency synchronization is established, the switch 51 is in the ON state and the switch 52 is in the OFF state. That is, one of the loop including the second phase comparator 42 and the loop including the first phase comparator 41 operates according to the level of the lock signal output from the lock detector 43.

The charge pump 44 receives the second phase-difference signal output from the second phase comparator 42 during a period in which the lock detector 43 detects that frequency synchronization is not established. The charge pump 44 receives the first phase-difference signal output from the first phase comparator 41 during a period in which the lock detector 43 detects that frequency synchronization is established. The charge pump 44 outputs, to the loop filter 45, a charge/discharge current having an amount corresponding to the phase difference represented by the input first phase-difference signal or the second phase difference signal.

The loop filter 45 inputs the charge/discharge current output from the charge pump 44 into the capacitor or capacitors and outputs a voltage value corresponding to the amount of charge accumulated in the capacitor or capacitors to the voltage-controlled oscillator 46. The voltage-controlled oscillator 46 receives the voltage value output from the loop filter 45 and outputs an oscillation signal having a frequency corresponding to the voltage value to the first phase comparator 41 and the frequency divider 48.

The recovery circuit 22 performs frequency synchronization based on the training signal by a loop including the second phase comparator 42 during a period in which the lock detector 43 detects that frequency synchronization is not established. The recovery circuit 22 performs phase synchronization based on a signal of data in which a clock is embedded by a loop including the first phase comparator 41 during a period when frequency synchronization is detected by the lock detector 43, outputs recovery data from the first phase comparator 41, and outputs an oscillation signal output from the voltage-controlled oscillator 46 as a recovery clock.

The lock signal output from the lock detector 43 of the recovery circuit 22 is provided to the selector 13 of the transmitter 10A via the output buffer 24 and the input buffer 15. In the transmitting and receiving system 1A of the comparative example, in addition to a communication link for transmitting a transmitting signal (data in which a clock is embedded) and a training signal from the transmitter 10A to the receiver 20A, a communication link for a lock signal for transmitting a lock signal indicating whether the recovering operation of the recovery circuit 22 is frequency-synchronized from the receiver 20A to the transmitter 10A is also required. In contrast, in the transmitting and receiving systems 1B to 1E of the embodiments described below, the lock signal communication link is not necessary.

Figure 3:
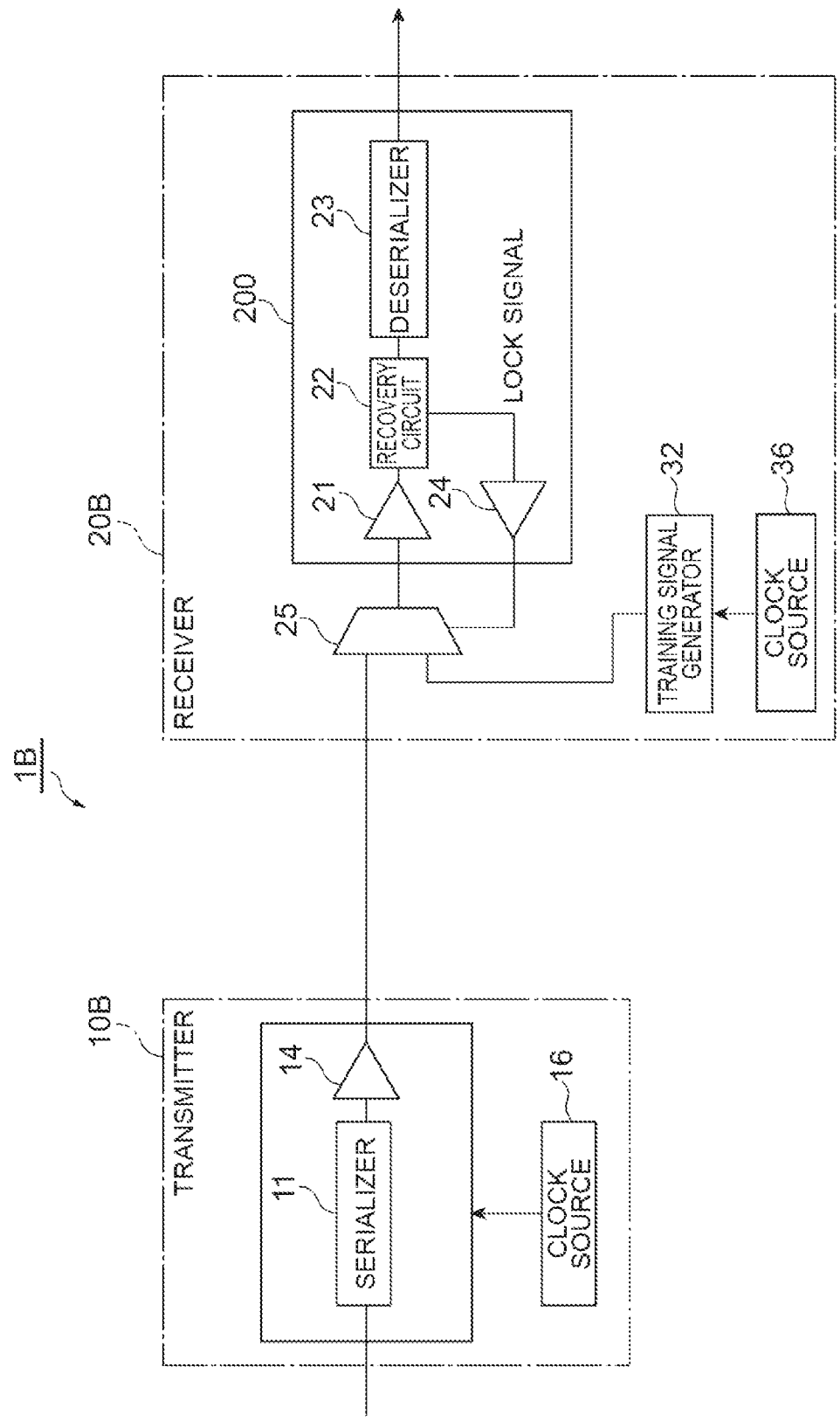
FIG. 3 is a diagram showing a configuration of a transmitting and receiving system 1B.

FIG. 3 is a diagram showing a configuration of the transmitting and receiving system 1B. The transmitting and receiving system 1B of the present embodiment comprises a transmitter 10B and a receiver 20B.

The transmitter 10B includes a serializer (transmitting signal generator) 11, an output buffer 14 and a clock source 16. Each of these elements has the same configuration as the corresponding element of the same name included in the transmitter 10A in FIG. 1. The transmitter 10B may not include the training signal generator 12, the selector 13 and the input buffer 15 included in the transmitter 10A in FIG. 1. The transmitter 10B can always transmit a signal (data in which a clock is embedded) generated by the serializer 11 to the communication link.

The receiver 20B includes a selector 25, a training signal generator 32, and a clock source 36 in addition to a circuit block 200 including the input buffer 21, the recovery circuit 22, the deserializer 23, and the output buffer 24 of the receiver 20A in FIG. 1.

The training signal generator 32 generates and outputs a training signal (for example, a signal having a duty ratio of 0.5 and a constant period) for frequency synchronization of the recovering operation of the recovery circuit 22. The training signal generator 32 may have the same configuration as the training signal generator 12. The clock source 36 outputs a reference clock for generating the training signal by he training signal generator 32.

The selector 25 receives a signal arriving via the communication link from the output buffer 14 of the transmitter 10B, and also receives a training signal output from the training signal generator 32. The selector 25 receives the lock signal output from the recovery circuit 22 via the output buffer 24, selects one of the received signal and the training signal according to the level of the lock signal, and outputs the selected signal to the input buffer 21. The input buffer 21 inputs the signal output from the selector 25 into the recovery circuit 22.

In the transmitting and receiving system 1B configured as described above, the signal (clock-embedded data) generated by the serializer 11 may always be received by the selector 25 of the receiver 20B via the output buffer 14.

When the recovering operation of the recovery circuit 22 of the receiver 20B is not frequency-synchronized, a lock signal indicating this is provided from the recovery circuit 22 to the selector 25 via the output buffer 24. In which case, the selector 25 selects and outputs the training signal, and provides the selected training signal to the recovery circuit 22 via the input buffer 21. The recovery circuit 22 frequency-synchronizes the recovering operation using the training signal.

When the recovering operation of the recovery circuit 22 is frequency-synchronized, a lock signal indicating this is provided from the 2.0 recovery circuit 22 to the selector 25 via the output buffer 24. In which case, the selector 25 selects and outputs the received signal (data in which a clock is embedded), and provides the received signal to the recovery circuit 22 via the input buffer 21. The recovery circuit 22 receiving this signal synchronizes the phase of the recovering operation and recovers the clock and data from the received signal.

The transmitting and receiving system 1B does not require a lock signal communication link for sending a lock signal from the receiver 20B to the transmitter 103, the lock signal indicating whether the recovering operation of the recovery circuit 22 is frequency-synchronized. In this manner, the number of communication links in transmitting and receiving signals using the CDR technique can be reduced. Furthermore, space saving and cost reduction can be achieved.

The reference clock output from the clock source 36 in the receiver 20B is used when the training signal generator 32 generates a training signal, and is not used when the recovery circuit 22 recovers the clock and data from the received signal after frequency synchronization. Therefore, even if both the transmitter and the receiver include the clock sources, the problem of the timing deviation of the sampling due to the difference in the oscillation frequencies of both the clock sources does not occur.

Figure 4:
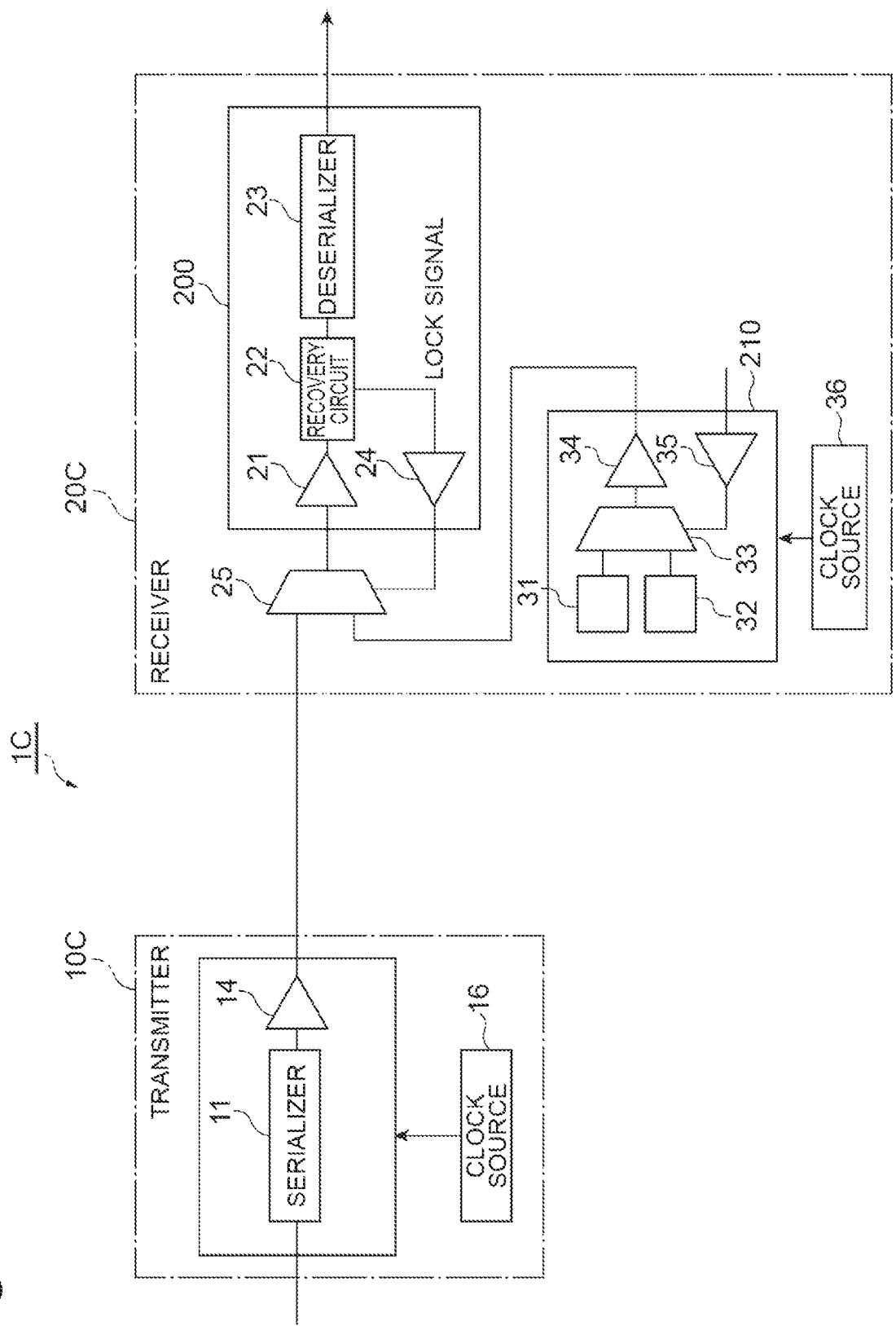
FIG. 4 is a diagram showing a configuration of a transmitting and receiving system 10.

FIG. 4 is a diagram showing a configuration of the transmitting and receiving system 1C. The transmitting and receiving system 1C of the present embodiment includes a transmitter 100 and a receiver 20C. The transmitter 10C has the same configuration as the transmitter 10B in FIG. 3.

The receiver 20C includes a first dummy signal generator 31, a first dummy selector 33, an output buffer 34, and an input buffer 35, in addition to the circuit block 200, the selector 25, the training signal generator 32, and the clock source 36 included in the receiver 20B in FIG. 3.

The first dummy signal generator 31 generates and outputs an arbitrary first dummy signal. The first dummy selector 33 receives the first dummy signal output from the first dummy signal generator 31 and the training signal output from the training signal generator 32, and always selects and outputs the training signal to the output buffer 34. The output buffer 34 outputs the training signal output from the first dummy selector 33 to the selector 25. The input buffer 35 always receives the same level as the level of the lock signal when the recovery circuit 22 is not frequency-synchronized, and gives the level to the first dummy selector 33.

The circuit block 210 including the first dummy signal generator 31, the training signal generator 32, the first dummy selector 33, the output buffer 34 and the input buffer 35 may be configured similarly to the circuit block 100 including the serializer 11, the training signal generator 12, the selector 13, the output buffer 14 and the input buffer 15 of the transmitter 10A in FIG. 1. The first dummy selector 33 is able to always select then output the training signal to the output buffer 34 due to the first dummy selector 33 always receiving a level identical to that of the lock signal when the frequency synchronization has not been established by the recovery circuit 22.

The transmitting and receiving system 10 configured as described above operates in the same manner as the transmitting and receiving system 1B described above and achieves the same effects. Note that the first dummy signal generator 31 does not substantially contribute to the operation of the transmitting and receiving system 10. The first dummy selector 33 does not substantially perform the selecting operation because it always selects and outputs the training signal.

In the transmitting and receiving system 10, the circuit block 200 of the receiver 200 may have the same circuit configuration as the circuit block 200 of the receiver 20A in FIG. 1. Further, the circuit block 210 of the receiver 200 may have the same circuit configuration as the circuit block 100 of the transmitter 10A in FIG. 1. Therefore, if there are already a semiconductor product comprising the circuit block 100 and a semiconductor product comprising the circuit block 200, the receiver 200 can be easily realized by using these two semiconductor products.

Figure 5:
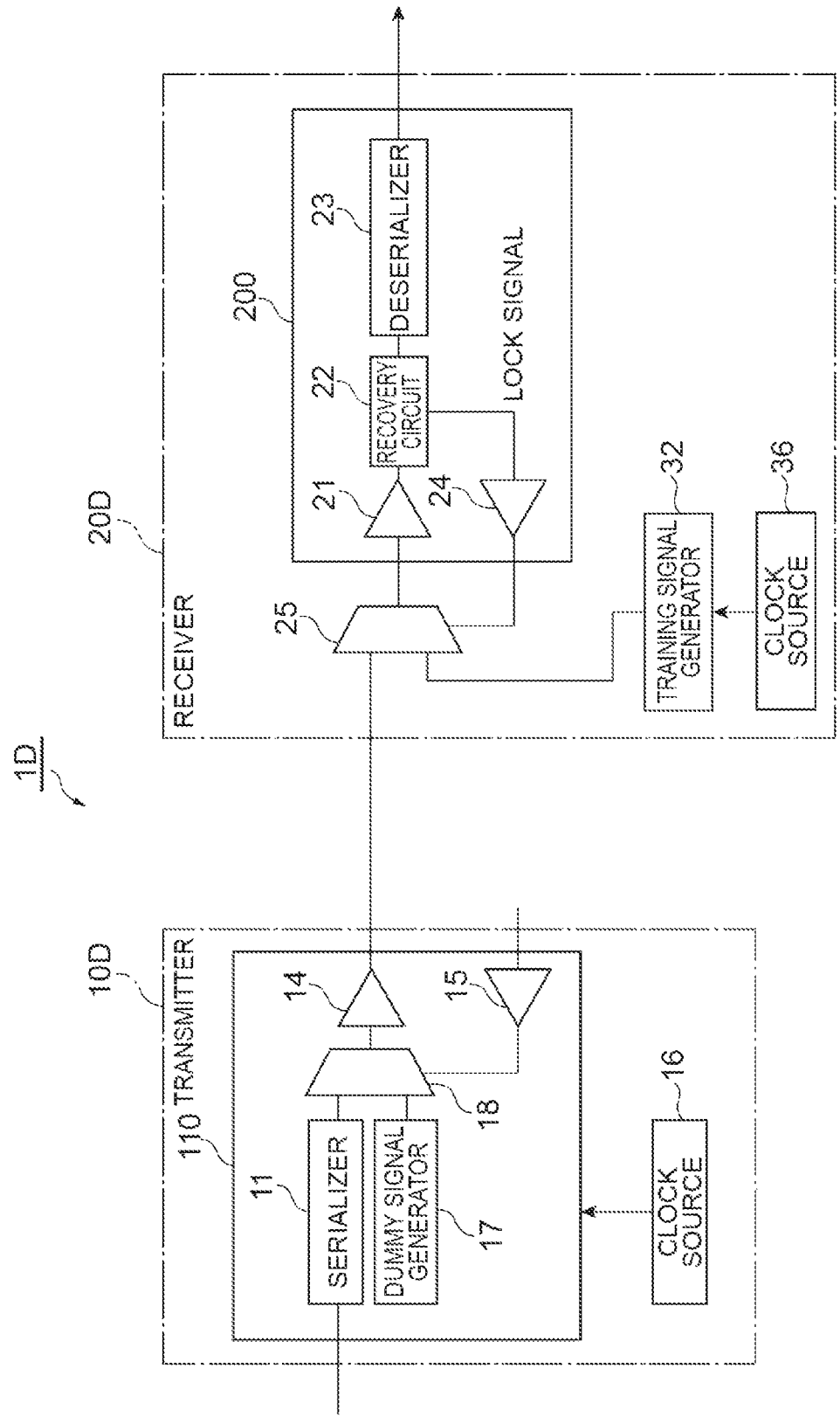
FIG. 5 is a diagram showing a configuration of a transmitting and receiving system 1D.

FIG. 5 is a diagram showing a configuration of the transmitting and receiving system 1D. The transmitting and receiving system 1D of the present embodiment includes a transmitter 10D and a receiver 20D. The receiver 20D has the same configuration as the receiver 20B in FIG. 3.

The transmitter 10D differs from the transmitter 10A in FIG. 1 in that the transmitter 10D includes a second dummy signal generator 17 instead of the training signal generator 12, the transmitter 10D includes a second dummy selector 18 instead of the selector 13, and the input buffer always receives a level identical to that of the lock signal when the frequency synchronization has been established in the recovery circuit 22.

The second dummy signal generator 17 generates and outputs an arbitrary second dummy signal. The second dummy selector 18 receives the transmitting signal (serial data in which a clock is embedded) output from the serializer 11 and the second dummy signal output from the second dummy signal generator 17, and always selects the transmitting signal and outputs it to the output buffer 14. The output buffer 14 transmits the transmitting signal output from the second dummy selector 18 to the communication link. The input buffer 15 always receives the same level as the level of the lock signal when the recovery circuit 22 establishes frequency synchronization, and supplies the level to the second dummy selector 18.

A circuit block 110 including the serializer 11, the second dummy signal generator 17, the second dummy selector 18, the output buffer 14, and the input buffer 15 may be configured similarly to the circuit block 100 of transmitter 10A in FIG. 1. The second dummy selector 18 can always select the transmitting signal (serial data in which the clock is embedded) output from the deserializer 11 and output it to the output buffer 14 because the second dummy selector 18 always receives the same level as the level of the lock signal when the recovery circuit 22 is frequency-synchronized.

The transmitting and receiving system 10 configured as described above operates in the same manner as the transmitting and receiving systems 1B and 10 described above, and achieves the same effects. The second dummy signal generator 17 does not substantially contribute to the operation of the transmitting and receiving system 1D. The second dummy selector 18 does not substantially perform the selecting operation because the second dummy selector 18 always selects and outputs the transmitting signal.

In transmitting and receiving system 1D, the circuit block 110 of transmitter 10D may have the same circuit configuration as the circuit block 100 of transmitter 10A in FIG. 1. Therefore, if there is already a semiconductor product comprising the circuit block 100, the transmitter 10D can be easily realized by using this semiconductor product.

Figure 6:
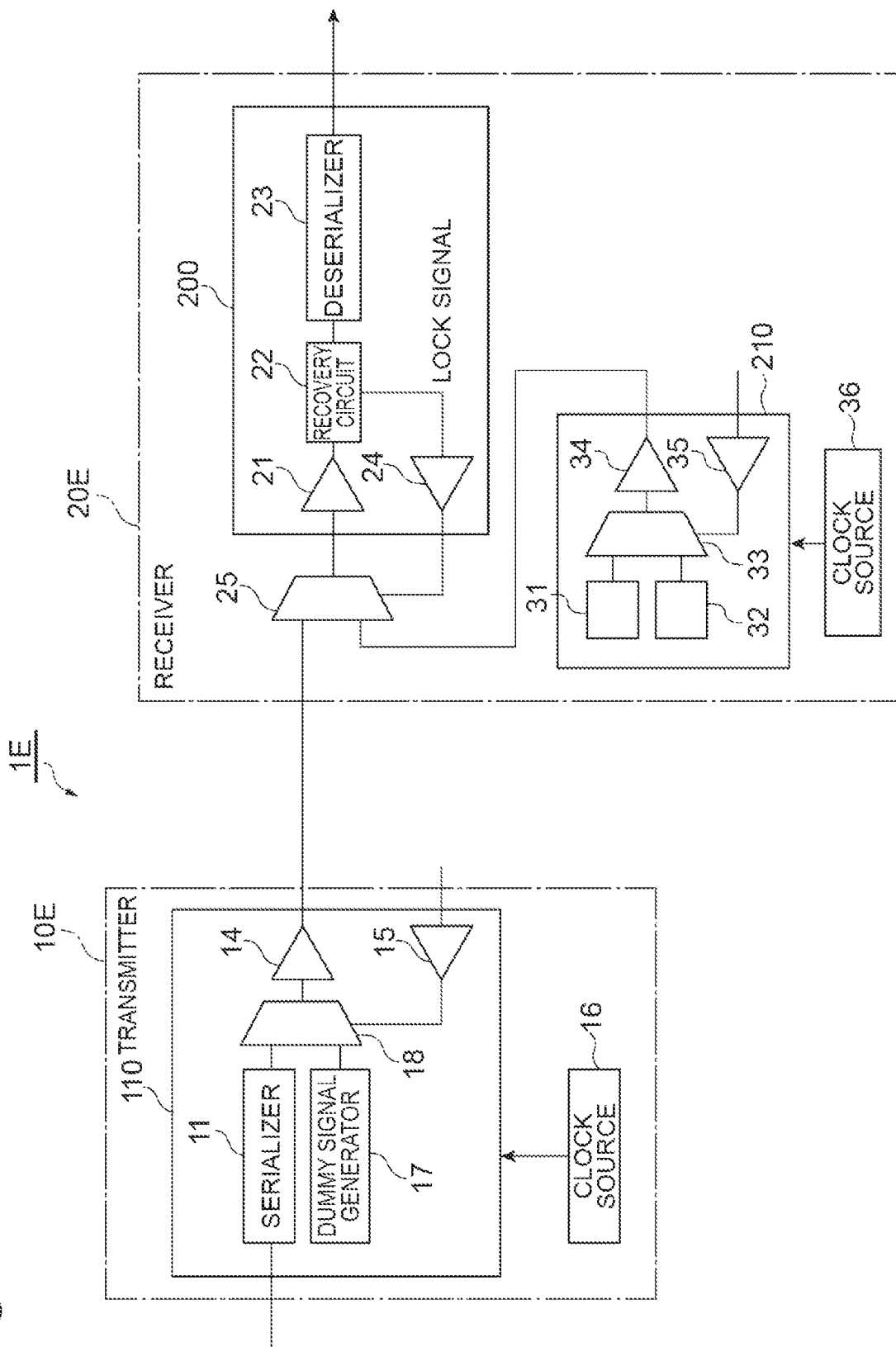
FIG. 6 is a diagram showing a configuration of a transmitting and receiving system 1E.

FIG. 6 is a diagram showing a configuration of the transmitting and receiving system 1E. The transmitting and receiving system 1E of the present embodiment includes a transmitter 10E and a receiver 20E. The transmitter 10E has the same configuration as the transmitter 10D in FIG. 5. The receiver 20E has the same configuration as the receiver 20C in FIG. 4.

The transmitting and receiving system 1E configured as described above operates in the same manner as the transmitting and receiving systems 1B to 1D described above and achieves the same effects. Note that the first dummy signal generator 31 does not substantially contribute to the operation of the transmitting and receiving system 1E. The first dummy selector 33 does not substantially perform the selecting operation, because the first dummy selector 33 always selects and outputs the training signal. The second dummy signal generator 17 does not substantially contribute to the operation of the transmitting and receiving system 1E. The second dummy selector 18 does not substantially perform the selecting operation, because the second dummy selector 18 always selects and outputs the transmitting signal.

In the transmitting and receiving system 1E, the circuit block 200 of the receiver 20E may have the same circuit configuration as the circuit block 200 of the receiver 20A in FIG. 1. The circuit block 210 of the receiver 20E may have the same circuit configuration as the circuit block 100 of the transmitter 10A in FIG. 1. The circuit block 110 of transmitter 10E may have the same circuit configuration as the circuit block 100 of transmitter 10A in FIG. 1. Therefore, if there are already a semiconductor product comprising the circuit block 100 and a semiconductor product comprising the circuit block 200, the transmitter 10E and the receiver 20E can be easily realized by using these two semiconductor products.

In any of the transmitting and receiving systems 1B to 1E, it is preferable to reduce the power consumption in the training signal generator 32 when the lock signal indicates that the recovering operation of the recovery circuit 22 is frequency-synchronized, compared to when the lock signal indicates that the recovering operation is not frequency-synchronized. It is also preferable to stop the training signal generator 32 when the lock signal indicates that the recovering operation is frequency-synchronized. These control manners can be also applied to the dock source 36. This makes it possible to reduce the power consumption of the receiver during the normal operation in which the recovery circuit 22 recovers the clock and data from the received signal.

Figure 7:
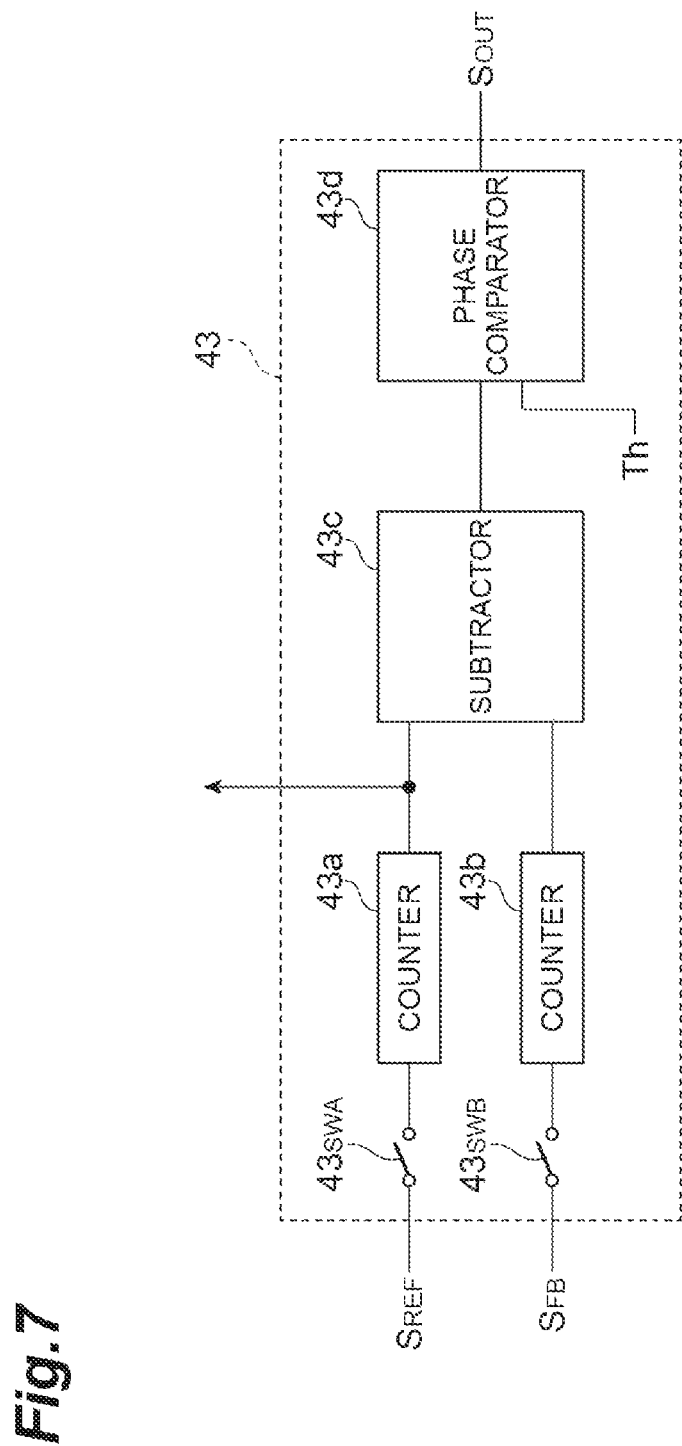
FIG. 7 is a diagram showing an example of the lock detector 43.

FIG. 7 is a diagram showing an example of the lock detector 43.

The output signal of the frequency divider 47 shown in FIG. 2 is referred to as a reference signal $S_{REF}$, and the output signal of the frequency divider 48 obtained by dividing the VCO output is referred to as a feedback signal $S_{FB}$. The reference signal $S_{REF}$ is a signal obtained by dividing an input signal (reference signal) to the selector 25. The reference signal $S_{REF}$ is input into a counter 43a via a switch $43_{SWA}$ for input control. The feedback signal $S_{FB}$ is input into a counter 43b via a switch $43_{SWB}$ for input control. In the initial state, the states of the switch $43_{SWA}$ and the switch $43_{SWB}$ are ON.

The output terminal of the counter 43a and the output terminal of the counter 43b are connected to the first and second input terminals of a subtractor 43c, respectively. The subtractor 43c outputs a difference ($\Delta$Count) between the input signals (count values of the number of input pulses) as an absolute value ($|\Delta$Count$|$). Since the outputs of the counter 43a and the counter 43b are digital values, the subtractor 43c is a digital subtractor and outputs the absolute value ($|\Delta$Count$|$) of the difference ($\Delta$Count) in this example.

The output terminal of the subtractor 43c is connected to the input terminal of a comparator 43d. The comparator 43d outputs whether the magnitude of the difference ($|\Delta$Count$|$) is larger than the threshold value Th ($|\Delta$Count$|$>Th) and indicates the state (H), or the magnitude is smaller than the threshold value Th ($|\Delta$Count$|\leq$Th) and indicates the state (L).

The comparator 43d is a digital comparator that compares digital values.

When the state of the output of the comparator 43d is L, the frequencies of the two input signals (the reference signal $S_{REF}$ and the feedback signal $S_{FB}$) substantially coincide with each other, and the frequencies are locked. That is, the output signal of the comparator 43d in the state L is a lock signal, which indicates a state in which the frequency is locked.

The input timing of the counter output into the subtractor 43c is when the value of one counter 43a reaches a predetermined value. The counter is, for example, a 4-bit or 8-bit counter. When the output of the counter 43a reaches a predetermined value, for example, when the $n^{th}$ bit changes from 0 to 1, the count operations of the counters 43a and 43b are stopped, and the count values of the counters at this time are input into the subtractor 43c. In order to stop the counter operation, for example, the output (H) of the $n^{th}$ bit of the counter 43a is taken out, the output is inverted (L), and the inverted output is input into the gates of the switch $43_{SWA}$ and the switch $43_{SWB}$ formed of N-type transistors in order to turn the state OFF.

The output (H) of the $n^{th}$ bit of the counter 43a may be input into a flip-flop (not shown) or a counter (not shown), and the value may be held to control the switch. The counter 43a and the counter 43b are reset at the same time by receiving a reset signal every predetermined period. The reset signal (H) is input into a flip-flop or a counter (not shown), the value is held, the value is input into the gates of the switch 43$_{SWA}$ and the switch 43$_{SWB}$ in order to to turn the state ON, and this state is continued until the next OFF state is reached.

As described above, the receiver comprises a selector (selector 25) comprising: a receiving signal input terminal, a reference signal input terminal (training signal input terminal), and a lock signal input terminal; a decoder (recovery circuit 22) comprising: a signal input terminal connected to an output terminal of the selector (selector 25), a recovery signal output terminal (output terminal on the deserializer 23 side), and a lock signal output terminal (output terminal on the output buffer 24 side) indicating a frequency synchronization state upon the recovery, wherein the lock signal output terminal being connected to the lock signal input terminal of the selector; and a reference signal generator (training signal generator 32) comprising a reference signal output terminal connected to the reference signal input terminal.

The decoder (recovery circuit 22) comprises: a voltage controlled oscillator 46; a first frequency divider 47 comprising an input terminal connected to the signal input terminal of the decoder; a first phase comparator 41 comprising a pair of input terminals respectively connected to the signal input terminal and an output terminal of the voltage controlled oscillator 46; a second frequency divider 48 connected to the output terminal of the voltage controlled oscillator 46; a second phase comparator 42 comprising a pair of input terminals respectively connected to an output terminal of the first frequency divider 47 and an output terminal of the second frequency divider 48; and a loop filter 45 comprising: an input terminal connected to an output terminal of the first phase comparator 41 via a first selection switch 51 and connected to an output terminal of the second phase comparator 42 via a second selection switch 52, and an output terminal connected to an input terminal of the voltage controlled oscillator 46.

The decoder further comprises: a first counter 43a comprising an input terminal connected to the output terminal of the first frequency divider 47; and a second counter 43b comprising an input terminal connected to the output terminal of the second frequency divider 48; a subtractor 43c comprising a pair of input terminals respectively connected to an output terminal of the first counter 43a and an output terminal of the second counter 43b; and a comparator 43d comprising; an input terminal connected to an output terminal of the subtractor 43c, and an output terminal connected to control terminals (gates or bases of the transistors forming the switches) of the first and second selection switches 51, 52 and the lock signal output terminal.

Note that the charge pump 44 in the decoder 22 outputs a charge/discharge current having an amount corresponding to the phase differences represented by the input first phase difference signal or the second phase difference signal to the loop filter 45. It may have a configuration in which a voltage is input into the loop filter 45 instead of the current.

REFERENCE SIGNS LIST

1A~1E . . . transmitting and receiving system, 10A~10E . . . transmitter, 11 . . . serializer, 12 . . . training signal generator, 13 . . . selector, 14 . . . output buffer, 15 . . . input buffer, 16 . . . clock source, 17 . . . second dummy signal generator, 18 . . . second dummy selector, 20A~20E . . . receiver, 21 . . . input buffer, 22 . . . recovery circuit, 23 . . . deserializer, 24 . . . output buffer, 25 . . . selector, 31 . . . first dummy signal generator, 32 . . . training signal generator, 33 . . . first dummy selector, 34 . . . output buffer, 35 . . . input buffer, 36 . . . clock source, 41 . . . first phase comparator, 42 . . . second phase comparator, 43 . . . lock detector, 44 . . . charge pump, 45 . . . loop filter, 46 . . . voltage controlled oscillator, 47 . . . frequency divider, 48 . . . frequency divider, 51 . . . switch, 52 . . . switch, 53 . . . inverter circuit.

What is claimed is:

1. A receiver for receiving a signal transmitted as clock-embedded data from a transmitter, comprising:
    a recovery circuit for recovering and outputting data and clocks based on an input signal and outputting a lock signal indicating whether a recovering operation is frequency-synchronized;
    a training signal generator for generating and outputting a training signal for frequency-synchronizing the recovering operation of the recovery circuit; and
    a first selector that receives a signal from the transmitter, the training signal, and the lock signal, the first selector inputting the signal from the transmitter into the recovery circuit when the lock signal indicates that the recovering operation is frequency-synchronized, and the first selector inputting the training signal into the recovery circuit when the lock signal indicates that the recovering operation is not frequency-synchronized.

2. The receiver according to claim 1, wherein a power consumption in the training signal generator is reduced when the lock signal indicates that the recovering operation is frequency-synchronized compared to when the lock signal indicates that the recovering operation is not frequency-synchronized.

3. The receiver according to claim 1, further comprising:
    a first dummy signal generator that generates a first dummy signal; and
    a first dummy selector comprising:
        a first input terminal connected to the training signal generator;
        a second input terminal connected to the first dummy signal generator; and
        an output terminal connected to an input terminal of the first selector, outputting the training signal to the first selector.

4. A transmitting and receiving system comprising:
    a transmitter that transmits a signal as data in which a clock is embedded; and
    the receiver according to claim 3 that receives the signal transmitted from the transmitter,
    wherein the transmitter comprises:
        a transmitting signal generator for generating and outputting a transmitting signal to be transmitted to the receiver,
        a second dummy signal generator for generating and outputting a second dummy signal, and
        a second dummy selector comprising:
            a first input terminal connected to the transmitting signal generator;
            a second input terminal connected to the second dummy signal generator; and
            an output terminal for outputting the transmitting signal to the receiver.

5. A transmitting and receiving system comprising:
    a transmitter that transmits a signal as data in which a clock is embedded; and
    the receiver according to claim 1 that receives the signal transmitted from the transmitter.

6. The transmitting and receiving system according to claim 5, wherein the transmitter includes:
a transmitting signal generator that generates and outputs a transmitting signal to be transmitted to the receiver;
a second dummy signal generator that generates and outputs a second dummy signal; and
a second dummy selector comprising:
- a first input terminal connected to the transmitting signal generator;
- a second input terminal connected to the second dummy signal generator; and
- an output terminal for outputting the transmitting signal to the receiver.

7. A receiver, comprising:
a selector comprising:
- a receiving signal input terminal,
- a reference signal input terminal, and
- a lock signal input terminal;
a decoder comprising:
- a signal input terminal connected to an output terminal of the selector,
- a recovery signal output terminal, and
- a lock signal output terminal indicating a frequency synchronization state upon the recovery, wherein the lock signal output terminal being connected to the lock signal input terminal; and
a reference signal generator comprising a reference signal output terminal connected to the reference signal input terminal.

8. The receiver according to claim 7,
wherein the decoder comprises:
a voltage-controlled oscillator;
a first frequency divider comprising an input terminal connected to the signal input terminal;
a first phase comparator comprising a pair of input terminals respectively connected to the signal input terminal and an output terminal of the voltage-controlled oscillator;
a second frequency divider connected to the output terminal of the voltage-controlled oscillator;
a second phase comparator comprising a pair of input terminals respectively connected to an output terminal of the first frequency divider and an output terminal of the second frequency divider; and
a loop filter comprising:
- an input terminal connected to an output terminal of the first phase comparator via a first selection switch and connected to an output terminal of the second phase comparator via a second selection switch, and
- an output terminal connected to an input terminal of the voltage-controlled oscillator.

9. The receiver according to claim 8,
wherein the decoder further comprises:
a first counter comprising an input terminal connected to the output terminal of the first frequency divider; and
a second counter comprising an input terminal connected to the output terminal of the second frequency divider;
a subtractor comprising a pair of input terminals respectively connected to an output terminal of the first counter and an output terminal of the second counter; and
a comparator comprising:
- an input terminal connected to an output terminal of the subtractor, and
- an output terminal connected to control terminals of the first and second selection switches and the lock signal output terminal.

* * * * *